United States Patent
Dooley et al.

[11] 3,780,530
[45] Dec. 25, 1973

[54] COMBUSTION CHAMBER

[75] Inventors: Philip G. Dooley, Bolton, Conn.;
  Sotiris Lambiris, Lawrenceville, N.J.

[73] Assignee: United Aircraft Corporation, East Hartford, Conn.

[22] Filed: Oct. 23, 1969

[21] Appl. No.: 868,677

[52] U.S. Cl....... 60/39.69, 60/39.72 R, 60/39.74 R, 60/262, 431/350
[51] Int. Cl............................. F02k 3/04, F23r 1/04
[58] Field of Search....................... 60/39.74, 39.72, 60/39.69, 39.65, 261, 262, 224, 226 R; 431/350

[56] References Cited
UNITED STATES PATENTS

| | | | |
|---|---|---|---|
| 2,697,910 | 12/1954 | Brzozowski | 60/39.71 |
| 2,729,059 | 1/1956 | Foure | 60/261 |
| 2,734,341 | 2/1956 | Lovesey | 60/39.74 |
| 3,024,608 | 3/1962 | Carlotti | 60/39.65 |

FOREIGN PATENTS OR APPLICATIONS

| | | | |
|---|---|---|---|
| 768,049 | 6/1955 | Germany | 60/39.69 |
| 774,059 | 5/1957 | Great Britain | 60/224 |
| 816,878 | 7/1959 | Great Britain | 60/39.74 |

*Primary Examiner*—Douglas Hart
*Attorney*—Jack N. McCarthy

[57] ABSTRACT

A combustion chamber or duct heater which provides an enclosed volume where partial combustion occurs and a transverse momentum is imparted to the burning gases to obtain mixing and burning with a secondary fuel supply.

14 Claims, 3 Drawing Figures

PATENTED DEC 25 1973 3,780,530
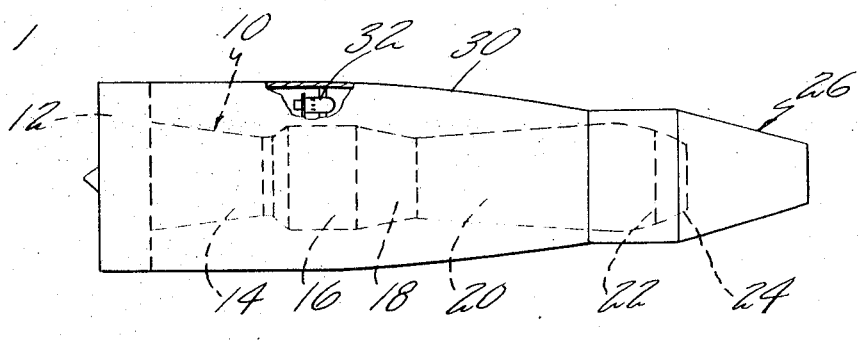
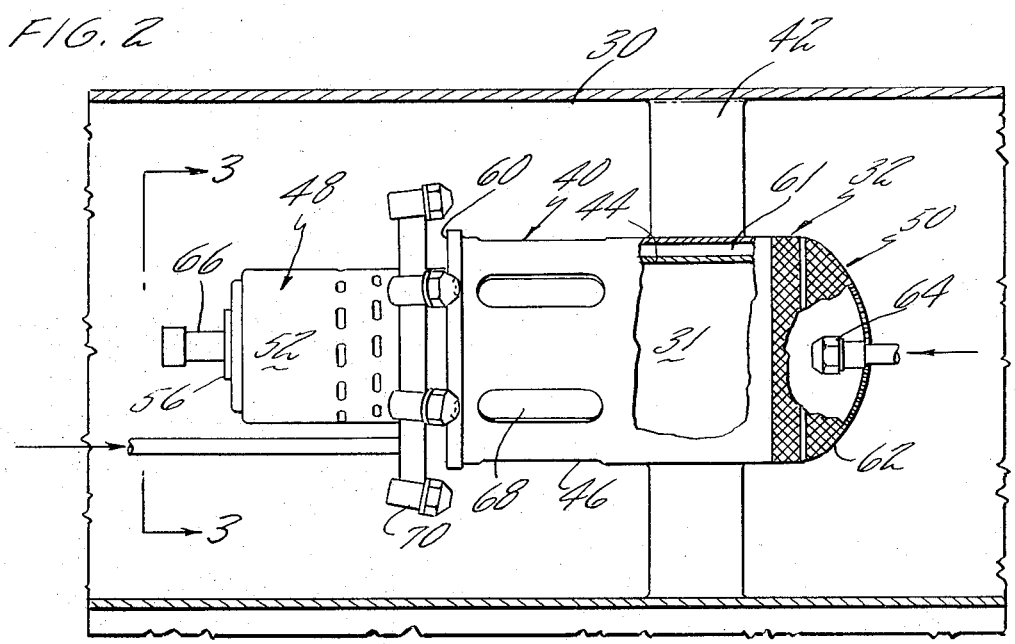
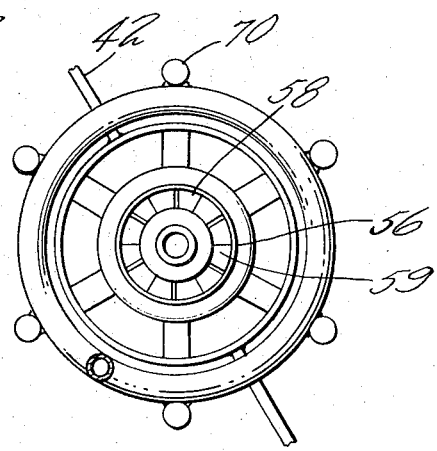
INVENTORS
PHILIP G. DOOLEY
SOTIRIS LAMBIRIS
BY James A. Kane
AGENT

COMBUSTION CHAMBER

BACKGROUND OF THE INVENTION

This invention relates to combustion chambers for gas turbine engines.

As jet engines increase in size and as the requirements placed on the propelling gas turbines become more stringent, it becomes highly desirable to obtain a means for augmenting the thrust of these engines. The prior art to a great extent has recognized these requirements and has utilized such constructions as ducted fans, turboprop engines and afterburners. Additionally, a great number of engines have utilized various exhaust nozzle configurations and hollow and cooled structural and aerodynamic members.

However, while most of these various constructions serve the purpose for which they were intended, they leave something to be desired as to providing the required thrust augmentation over the entire flight range or under severe conditions. More specifically, the prior art constructions fail to provide a combustion chamber which is capable of operating efficiently at high Mach numbers, low temperatures and a wide fuel-air mixture range while being relatively short in length.

SUMMARY OF THE INVENTION

The primary object of this invention is to provide an improved combustion chamber construction. It is a further object of this invention to provide thrust augmentation in the bypass duct of a turbofan engine. It is a further object of this invention to provide a combustion chamber or duct burner which is capable of providing thrust augmentation under severe operating conditions and over the entire flight regime of the engine.

The present invention accomplishes the foregoing objects by utilizing a body construction which provides an enclosed volume within which a portion of burning is accomplished. More specifically, a stable primary combustion zone, requiring a relatively small portion of the total combustion airflow, feeds heated fuel rich burning gases into a secondary zone. It is through this secondary zone that the combustion air not used in the primary zone passes with a relatively small pressure loss.

The fuel for the secondary zone is sprayed from a plurality of fuel nozzles positioned around the periphery of the body construction. This fuel ignited by the burning gases exiting from the primary zone disperses and burns in the secondary airstream. The effect of the foregoing is that each flaming droplet of fuel acts as its own flameholder as it burns to completion in the fast moving secondary stream. Therefore, as long as the primary zone keeps producing hot gases and igniting the secondary fuel droplets, variations in secondary fuel-air ratio or Mach number do not adversely affect performance.

BRIEF DESCRIPTION OF THE DRAWINGS

FIG. 1 is an elevation view of an aircraft jet engine employing a combustion chamber of the present invention in a duct heater embodiment.

FIG. 2 is a sectional elevation view of the combustion chamber of the present invention.

FIG. 3 is a sectional end view of the combustion chamber of the present invention.

DESCRIPTION OF THE PREFERRED EMBODIMENT

Referring to FIG. 1, a gas turbine turbofan engine 10 is illustrated. Engine 10 includes an inlet and fan section 12, a compressor section 14 downstream of the fan section 12, a combustion chamber 16 downstream of the compressor section, a turbine section 18 downstream of the burner section, and an afterburner section 20 downstream of the turbine section. The discharge end 22 of engine 10 has a primary variable area exhaust nozzle 24 and a variable area ejector nozzle structure 26 associated therewith. In the present embodiment shown, engine 10 also utilizes a duct 30 within which is positioned a duct heater or burner 32 positioned downstream of fan 12 and upstream of afterburner 20.

Referring to FIGS. 2 and 3, an embodiment of the present invention is illustrated. In this embodiment, the present invention is utilized as a duct heater; however, it should be borne in mind that the construction of the present invention may be used as an afterburner or main combustion chamber and that the present embodiment is merely illustrative. Also, the embodiment shown utilizes a plurality of elements arranged in the annular duct passage although a fully annular design may be preferred in some cases.

As shown, duct heater 32 includes body 40 which is positioned within duct 30. Duct heater 32 is positioned within duct 30 and supported therefrom by aerodynamic shaped struts 42. Body 40 comprises a pair of radially spaced walls 44 and 46, an upstream closure member 48 and a downstream closure member 50. The arrangement of these respective parts is such that they form an enclosed volume 31 within duct 30.

Upstream closure member 48 in this embodiment includes inlet means 52 for the admission of a small portion of the air flowing through duct 30. It has been determined that in one preferred embodiment a swirler ring 56 for imparting a swirl to the incoming air is desirable. It has also been determined that desirable results can be obtained when a swirler ring with alternate vanes 58 blocked to the passage of air, as at 59, is utilized.

In addition to the air inlet means afforded through swirler ring 56, an annular mid-section primary air inlet 60 is employed. The annular mid-section air intake 60 includes a passage 61 extending downstream and lengthwise of body 40. This passage is in communication with closure member 50, which includes a porous member 62. Porous member 62 which may be screen construction or any other similar construction, which is in communication with intake 60 thereby permits a portion of the air flowing through duct 30 to be admitted to the enclosed volume within body 40 at its upstream side. Therefore, in the present embodiment, primary air is admitted through swirler 56, this air flowing from an upstream to downstream direction, while the air admitted through opening 60 flows downstream and a portion of it is discharged through the porous member 62 while the remainder turns to flow in an upstream direction into volume 31.

Body 40 includes primary fuel nozzle 64 which is positioned at the downstream end of body 40 and extends therethrough into the enclosed volume therewith. Means for igniting the fuel and air within the enclosed volume are provided at the upstream end of body 40 as at 66.

The burning of this fuel-air mixture is accomplished within the enclosed volume 31 which is a heterogeneous combustion zone. The burning gases exit from this heterogeneous combustion zone 31 through slots or holes 68 which are positioned around the periphery of body 40. Positioned upstream of these slots 68 and also around the periphery of body 40 is a plurality of secondary fuel nozzles 70. These secondary fuel nozzles 70 are arranged so that the fuel droplets sprayed therefrom have a transverse momentum to that of the burning mixture. As a result, a trajectory is imparted thereto and the droplets of secondary fuel, which are ignited by the burning fuel-air mixture, are dispersed across entire duct 30.

We claim:

1. A burner construction for burning a fuel-air mixture over a wide fuel-air mixture range comprising;
   wall means for defining a combustion space,
   a body positioned within the combustion space and supported from the wall means, the body defining a primary combustion zone therewithin, the body having means for the admission of combustion air to said combustion zone, means for supplying fuel, means for igniting the fuel-air mixture, and radial exit means for the radial exit of the burning fuel-air mixture; and
   a secondary fuel injection system positioned around the body, the secondary fuel injection system being arranged upstream of the radial exit means so as to impart a transverse momentum to the burning fuel air mixture discharging radially from the primary combustion zone, the secondary fuel being ignited by the burning fuel-air mixture emitted from the primary combustion zone with the burning secondary fuel mixing and being dispersed across the airstream of the entire combustion space.

2. A burner construction as in claim 1 wherein;
   the body includes a porous member at its downstream end, the porous member being in communication with an annular intake positioned around the periphery of the body.

3. A burner construction as in claim 1 wherein;
   the means for the admission of combustion air at the upstream end of the body includes a swirler ring construction for imparting a swirl to the air.

4. A burner construction as in claim 1 wherein;
   the fuel supply for the primary combustion zone is at the downstream end of the body, and the fuel supply means faces upstream.

5. A combustion chamber for a gas turbine heater comprising;
   a primary combustion zone,
   a pilot combustion zone upstream of the primary combustion zone, the pilot zone comprising a hollow body, the body having means for the admission of air and fuel, means for igniting the fuel-air mixture, and opening means in said body for permitting the burning mixture to exhaust radially therefrom, means comprising a screen member positioned at and enclosing the downstream portion of the body, and
   a plurality of secondary fuel nozzles positioned around the periphery of the body, the spray of the secondary nozzles being directed so as to impart an impulse type trajectory to the burning droplets ignited by the burning fuel discharging radially from the body.

6. A combustion chamber as in claim 5 wherein;
   the body includes an annular air passage therearound having an inlet and exit, the inlet being in communication with air flow and the exit being in communication with the screen member through at least one passage for the introduction of air at the downstream end of the body.

7. A combustion chamber as in claim 5 wherein;
   the fuel supply means for the pilot zone and the secondary fuel nozzles face in opposite directions, the secondary nozzles facing downstream while the primary fuel supply means faces upstream.

8. A combustion chamber as in claim 7 wherein;
   the discharge means for the burning gases comprise a plurality of openings positioned around the periphery of the body substantially adjacent the secondary nozzles.

9. A duct heater for a turbofan engine comprising;
   a pair of radially spaced walls, the walls forming a circumferential space therebetween;
   a body positioned within the circumferential space, the body including a pair of radially spaced walls, an upstream closure member, the upstream closure member having means for the admission of air, and a downstream closure member, the downstream closure member being porous, the body thereby forming an enclosed volume for burning a fuel-air mixture;
   a primary fuel means for supplying fuel to the enclosed volume;
   means for igniting the fuel-air mixture in the enclosed volume; and
   secondary fuel injection means positioned around the periphery of the body, the spray from the secondary fuel nozzles being ignited by the burning fuel-air mixture and dispersed across the circumferential space while simultaneously mixing and burning therein.

10. A duct heater as in claim 9 wherein;
    the primary fuel means and the secondary fuel means are oppositely faced, the primary facing upstream while secondary faces downstream.

11. A duct heater as in claim 10 wherein;
    the primary fuel means is at the downstream end of the body and extends through the porous portion of the body.

12. A duct heater as in claim 9 wherein;
    the upstream closure member includes a swirler ring and alternate vanes of the swirler ring sealed against the admission of air into the swirler ring.

13. A duct heater as in claim 9 wherein;
    the body includes an annular air passage therearound having an inlet and exit, the inlet admitting air and the exit being in communication with the porous member through at least one passageway, air thereby being turned substantially 180° for admission to the enclosed volume at the downstream end of the body.

14. A duct heater as in claim 13 wherein;
    the discharge means for the burning gases comprise a plurality of openings positioned around the circumference of the body, the openings being adjacent the secondary nozzles.

* * * * *